(12) United States Patent
Stefani et al.

(10) Patent No.: US 9,821,679 B2
(45) Date of Patent: Nov. 21, 2017

(54) METHOD FOR THE DIAGNOSIS OF THE OFFSET OF THE RESOLVER OF AN ELECTRIC MACHINE

(71) Applicant: MAGNETI MARELLI S.p.A., Corbetta (Milan) (IT)

(72) Inventors: Andrea Stefani, Bologna (IT); Alessandro Fossi, Imola (IT); Roberto Betro', Soverato (IT); Marco Raimondi, Piumazzo (IT); Canio Caterini, Cancellara (IT)

(73) Assignee: MAGNETI MARELLI S.p.A., Corbetta (IT)

( * ) Notice: Subject to any disclaimer, the term of this patent is extended or adjusted under 35 U.S.C. 154(b) by 0 days.

(21) Appl. No.: 14/823,601

(22) Filed: Aug. 11, 2015

(65) Prior Publication Data

US 2016/0043614 A1 Feb. 11, 2016

(30) Foreign Application Priority Data

Aug. 11, 2014 (IT) .............................. TO2014A0654

(51) Int. Cl.
*H02P 21/00* (2016.01)
*H02P 6/10* (2006.01)
(Continued)

(52) U.S. Cl.
CPC .......... *B60L 15/025* (2013.01); *G01D 5/2073* (2013.01); *G01D 5/2448* (2013.01);
(Continued)

(58) Field of Classification Search
CPC ........... H02P 6/16; H02P 6/10; H02P 21/0096
(Continued)

(56) References Cited

U.S. PATENT DOCUMENTS

2005/0104551 A1* 5/2005 Nishimura .............. H02P 25/03
                                                        318/719
2006/0290305 A1* 12/2006 Washino ................... H02P 6/10
                                                        318/432
(Continued)

FOREIGN PATENT DOCUMENTS

EP       2 437 391 A1    4/2012
FR       2 990 088 A1   11/2013
JP      2005143256 A  *  6/2005

OTHER PUBLICATIONS

Search Report for Italian Patent Application No. TO20140654 dated Apr. 23, 2015.

*Primary Examiner* — Eduardo Colon Santana
*Assistant Examiner* — Cortez Cook
(74) *Attorney, Agent, or Firm* — Howard & Howard Attorneys PLLC

(57) ABSTRACT

A method for the diagnosis of the offset of the resolver of an electric motor, comprising acquiring a predetermined offset of a resolver associated with the electric motor; in a first transient, supplying an excitation current to the phases of the electric motor. As a consequence of the excitation current, a current established on the axis d of minimum reluctance and a current established on an axis q in phase quadrature with respect to the axis of minimum reluctance are determined. The correctness of the offset of the resolver is diagnosed if the current established on the axis d in the first transient is higher than the current established on the axis d in the second or third transient, and if the current established on the axis q in the first transient is lower than the current established on the axis q in the second or third transient.

8 Claims, 3 Drawing Sheets

(51) Int. Cl.
  *H02P 6/16* (2016.01)
  *B60L 15/02* (2006.01)
  *H02K 11/00* (2016.01)
  *H02P 6/18* (2016.01)
  *H02P 21/32* (2016.01)
  *G01D 5/20* (2006.01)
  *G01D 5/244* (2006.01)

(52) U.S. Cl.
  CPC .......... *H02K 11/0031* (2013.01); *H02P 6/183* (2013.01); *H02P 21/32* (2016.02); *H02P 2203/11* (2013.01)

(58) Field of Classification Search
  USPC ................... 318/400.02, 400.21, 432, 400.38
  See application file for complete search history.

(56) References Cited

U.S. PATENT DOCUMENTS

| | | | |
|---|---|---|---|
| 2010/0171455 A1 | 7/2010 | Schulz et al. | |
| 2013/0106325 A1* | 5/2013 | Savio | H02P 21/22 318/400.04 |
| 2013/0134914 A1* | 5/2013 | Williams | H02P 6/007 318/400.13 |
| 2014/0015457 A1* | 1/2014 | Kwon | H02P 21/0096 318/400.02 |
| 2015/0134284 A1 | 5/2015 | Negre | |

\* cited by examiner

METHOD FOR THE DIAGNOSIS OF THE OFFSET OF THE RESOLVER OF AN ELECTRIC MACHINE

CROSS-REFERENCE TO RELATED APPLICATIONS

The present application claims priority to and all the benefits of Italian Patent Application No. TO2014A000654, filed on Aug. 11, 2014, which is hereby expressly incorporated herein by reference in its entirety.

BACKGROUND OF THE INVENTION

1. Field of the Invention

The present invention relates in general to electric motors and, in particular, to a diagnostic methodology for the recognition of the mutual positioning of a rotor and a stator in an electric motor, specifically an electric motor without brushes (brushless) with internal magnets, such as for example a drive motor for a vehicle.

2. Description of the Related Art

An electric motor, such as an electric starter motor or a drive motor for an electric or hybrid vehicle, is conventionally equipped with a device for sensing the angular position or resolver, adapted to determine the mutual angular position between a rotary shaft and a stationary portion of the motor, which corresponds to the mutual angular position between a rotor and a stator.

The information on angular position between rotor and stator is indispensable in the control of an electric motor, so that a unit for controlling the motor including an inverter circuit for generating the excitation currents of the motor is able to control the injection of current into the motor in the correct manner, controlling the rotation of the motor in the desired direction.

The resolver is an analogue transducer of angular position, which comprises a mobile part, associated with the rotor or with the rotary shaft of the electric motor, and a fixed part, associated with the stator or with another stationary portion of the electric motor. The resolver comprises an excitation winding through which a sinusoidal excitation current flows (with an angular frequency $\omega$ higher than the angular velocity), and two stationary windings (rigidly attached to the fixed part) in electrical phase quadrature. The excitation winding may be rigidly attached to the mobile part, or this may also be accommodated on the fixed part, if the mobile part has at least one pair of magnetic poles.

The principle of operation of the resolver is as follows: the mobile part set in rotation induces in the fixed windings an e.m.f. composed of two components: a first component of transformer-type origin, due to the variations in an excitation voltage $V_r$, and a second component due to the relative motion of the mobile part with respect to the fixed windings, which is proportional to the sine or to the cosine of the angle $\theta$ identified by the position of the mobile part with respect to a predetermined reference. Choosing $\theta=0$ when the excitation winding or a particular magnetic pole of the mobile part is aligned with one of the two fixed windings, the expressions for the voltage signals $V_{s1}$ and $V_{s2}$ at the ends of the fixed windings are respectively:

$$V_r(t) = V_R \sin(\omega t)$$

$$v_{s1} = V_R \cdot \sin(\omega \cdot t) \cdot \cos(\theta)$$

$$v_{s2} = V_R \cdot \sin(\omega \cdot t) \cdot \sin(\theta)$$

The sine and the cosine of the angular position of the mobile part modulate in amplitude the carrier with an angular frequency $\omega$ present on the winding excitation. From the voltage signals $V_{s1}$ and $V_{s2}$ at ends of the fixed windings, by demodulation, it is possible to obtain an estimate of the angle $\theta$.

In the production line of an electric motor, the mobile part and the fixed part of the resolver are stably attached to the motor in a random, undetermined position or—as an alternative, if a controlled procedure for assembly of the resolver with respect to the stator of the motor is provided—in a position close to a nominal value, taking into account the assembly tolerances, whereby a difference is established between the reference position of the resolver and a reference position of minimum reluctance of the electric motor, commonly known as offset of the resolver.

This position is measured at the end of the assembly line of an electric motor and is stored in memory within the control unit of the motor as the predetermined offset of the resolver. One representative example of a method for calibrating the offset of the resolver is disclosed in published US Application 2014/015457.

In normal operation of the electric motor, the control unit is capable of determining the correct angular position of the motor (the mutual angular position between stator and rotor) based on the output signal of the resolver knowing the offset of the resolver.

During the normal operation of an electric motor, it is possible for anomalies to occur, for example on the rotor, in such a manner as to modify the offset of the resolver with respect to the predetermined one imposed at the production site.

If the control unit of the motor does not recognize a modification of the offset of the resolver, the latter is no longer capable of determining the correct angular position of the motor or the position of minimum reluctance of the motor, which causes a lower torque to be provided or creates even serious drawbacks, such as unexpected behaviours in acceleration and deceleration when the vehicle is being driven, and—as a result of the erroneous control of the motor—the rupture of the rotor which determines the blocking of the motor drive shaft or the rupture of the pinion.

Equally disadvantageously, in the case of use of the electric motor in the start phase for the drive, the erroneous interpretation of the position of the rotor by the control unit may cause the inversion of the sign of the torque applied to the drive shaft with respect to that requested, causing the movement of the vehicle in the opposite direction to that desired, with consequent serious risks for the people on board the vehicle or around it.

SUMMARY OF THE INVENTION

The aim of the present invention is thus to provide a satisfactory solution to the aforementioned problems, while avoiding the drawbacks of the known technology. In particular, the aim of the present invention is to provide a method that may be implemented on board an electric motor for recognizing a modification of the offset of the resolver, for example a modification of the offset of the resolver caused accidentally, i.e. for recognizing if the actual offset of the resolver corresponds to the predetermined offset of the resolver.

The disadvantages of the related art are overcome in the method for the diagnosis of the offset of the resolver of an electric motor of the present invention. The method includes the steps of acquiring a predetermined offset of a resolver associated with the electric motor, and supplying an excitation current to the phase of the electric motor in a first transient so as to determine the injection of an exploring excitation current on an axis of minimum reluctance of the electric motor in a rotating two-phase reference system (d-q) associated with a rotor of the electric motor in which the position of the axis of minimum reluctance is determined as a function of the predetermined offset of the resolver. In addition, the method includes the steps of determining a current established on the axis of a minimum reluctance and a current established on an axis in phase quadrature with respect to the axis of minimum reluctance as a consequence of the excitation current and as a function of the current detected on the phases of the electric motor. An excitation current is supplied to the phases of the electric motor in a second and a third transient, respectively, so as to determine the injection of an exploring excitation current on the axis of minimum reluctance of the electric motor in which the position of the axis of minimum reluctance is determined as a function of a modified offset of the resolver. The offset of the resolver is modified by a predetermined amount of deviation, in excess, respectively, in defect with respect to the predetermined offset of the resolver. The correctness of the predetermined offset of the resolver is diagnosed if the current established on the axis of minimum reluctance in the first transient is higher than the current established on the axis of minimum reluctance in the second or third transient, or if the current established on the axis in phase quadrature with respect to the axis of minimum reluctance in the first transient is lower than the current established on the axis in phase quadrature with respect to the axis of minimum reluctance in the second or third transient. Alternatively, an error in the predetermined offset of the resolver is diagnosed if the current established on the axis of minimum reluctance in the second or third transient, or if the current established on the axis of phase quadrature with respect to the axis of minimum reluctance in the first transient is higher than the current established on the axis in phase quadrature with respect to the axis of minimum reluctance in the second or third transient.

A further subject of the invention is a system for the diagnosis of the offset of the resolver of an electric motor, arranged for implementing the method of the invention.

In summary, the present invention is based on the principle of diagnosing the offset of the resolver of an electric motor, known a priori since determined at the production site, with the purpose of determining the correctness of information on angular position of the electric motor, i.e. of verifying the validity of the predetermined offset of the resolver, i.e. the correspondence between the predetermined offset of the resolver and the actual offset of the resolver.

Diagnosis of the offset of the resolver of an electric motor involves verification of the correct phasing between an angular position of the resolver and the mutual angular position between rotor and stator of the electric motor.

The correctness of the assumed offset, i.e. the correspondence of the actual offset of the resolver with the predetermined offset of the resolver, is verified by exciting the motor in pulsed mode in a preset configuration of assumed minimum reluctance determined as a function of the offset of the resolver known a priori, and in preset positions angularly displaced with respect to the position of assumed minimum reluctance by a calibratable value. The position of minimum reluctance of an electric motor is a known position (acquired from the resolver having a knowledge of the predetermined offset of the resolver) obtained from the phase-shift between the magnetic axis of the stator phases (typically that associated with the phase a) and the rotor axis coinciding with the magnetic path that more is opposed to the magnetic field lines. In other words, the configuration of minimum reluctance is a configuration for which voltages applied to the phases of an electric motor exclusively determine the excitation of a current on an axis aligned to a phase of the motor, whereby an electromagnetic drive torque is not generated.

BRIEF DESCRIPTION OF THE DRAWINGS

Further features and advantages of the invention will be presented in more detail in the following detailed description of one embodiment, given by way of non-limiting example, with reference to the appended drawings, in which.

DETAILED DESCRIPTION OF THE INVENTION

For a correct understanding of the method subject of the invention, in the following by way of introduction, the mathematical theory is presented of direct and inverse transformation of the reference system ("Park transforms"), from a three-phase reference system (phases A, B, C of an electric motor) to a rotating two-phase reference system (d-q), which rotates aligned to the rotor of an electric motor, and vice versa.

Figure 1:
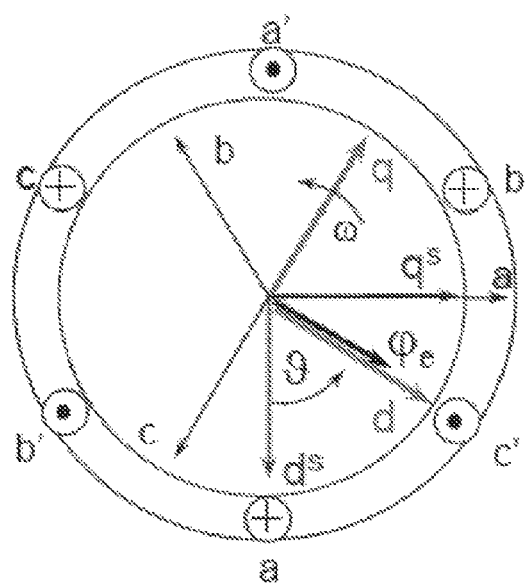
FIG. 1 is a representative diagram of the transformation from a three-phase reference system (ABC) to a rotating two-phase reference system (d-q) of the currents in an electric motor.

In FIG. 1 the rotational speed of the rotor is indicated by w, the axis d is the axis of minimum reluctance and the axis q is in phase quadrature with respect to the axis d.

Considering a transformation of the currents (but the same transforms are also applicable to the voltages), the reference system ABC is first of all convertible into a stationary reference system d-q (shown in the figure with apex s) in which the axes are located in a fixed reference, via the conversion matrix $$\begin{vmatrix} i_q^s \\ i_d^s \end{vmatrix} = \begin{vmatrix} 1 & 0 \\ -\frac{1}{\sqrt{3}} & -\frac{2}{\sqrt{3}} \end{vmatrix} \begin{vmatrix} i_a \\ i_b \end{vmatrix}$$

(where the current $i_c = -i_a - i_b$)

From a stationary two-phase reference system, the following matrix allows the transition from the currents $d^s$-$q^s$ to the currents d-q in a rotating reference system d-q:

$$\begin{vmatrix} i_q \\ i_d \end{vmatrix} = \begin{vmatrix} \cos(\vartheta) & -\sin(\vartheta) \\ \sin(\vartheta) & \cos(\vartheta) \end{vmatrix} \begin{vmatrix} i_q^s \\ i_d^s \end{vmatrix}$$

The transformations to be applied in order to obtain the inverse transformation from the rotating reference system d-q to the three-phase one ABC are implemented by applying the following matrices:

$$\begin{vmatrix} i_q^s \\ i_d^s \end{vmatrix} = \begin{vmatrix} \cos(\vartheta) & \sin(\vartheta) \\ -\sin(\vartheta) & \cos(\vartheta) \end{vmatrix} \begin{vmatrix} i_q \\ i_d \end{vmatrix}$$

and $$\begin{vmatrix} i_a \\ i_b \end{vmatrix} = \begin{vmatrix} 1 & 0 \\ -\dfrac{1}{2} & -\dfrac{\sqrt{3}}{2} \end{vmatrix} \begin{vmatrix} i_q^s \\ i_d^s \end{vmatrix}$$

The method for the diagnosis of the offset of the resolver of an electric motor that forms the subject of the present invention is carried out with the motor not in motion via the application of voltage pulses to the phases of the motor, having a sinusoidal waveform at a preset frequency, for example in the range between 400 Hz and 1.2 kHz, and preferably around 800 Hz, in such a manner as to determine the injection of pulses of an exploring excitation current on an axis of minimum reluctance of the system (axis d) and evaluating the effects that these have on the current that is established on the axis of minimum reluctance (axis d) and on the axis in quadrature to it (axis q).

In the motor, the injection of the exploring current on the axis d of the system happens, without generating torque, by establishing voltages or injecting current onto the phases according to the aforementioned equations of the Park transforms. In an analogous manner, the current on the axis of minimum reluctance and on the axis in quadrature is determined by reading the currents on the phases of the motor and interpreted according to the aforementioned equations.

The strategy for verifying the offset of the resolver comprises two phases.

In a motor, assuming a configuration of minimum reluctance, the injection of an exploring excitation current only on the axis d of the system corresponds to a current of maximum value, and proportional to the intensity of the injected exploring current, on this axis and to a current on the axis in quadrature theoretically zero.

In the case in which a configuration of minimum reluctance is not verified, the exploring excitation current is injected into a non-correct reference system, but phase-shifted by an angle equal to the offset from the configuration of minimum reluctance. This offset corresponds to the error on the offset of the resolver, i.e. to a condition where the predetermined offset of the resolver does not correspond to the actual offset of the resolver.

By applying the same exploring excitation current on the axis d in the non-correct reference a current on the axis d is obtained with a value less than the preceding value, and a current on the axis q with a value higher than that obtained by applying the exploring excitation current to the motor in the configuration of minimum reluctance.

Figure 2:
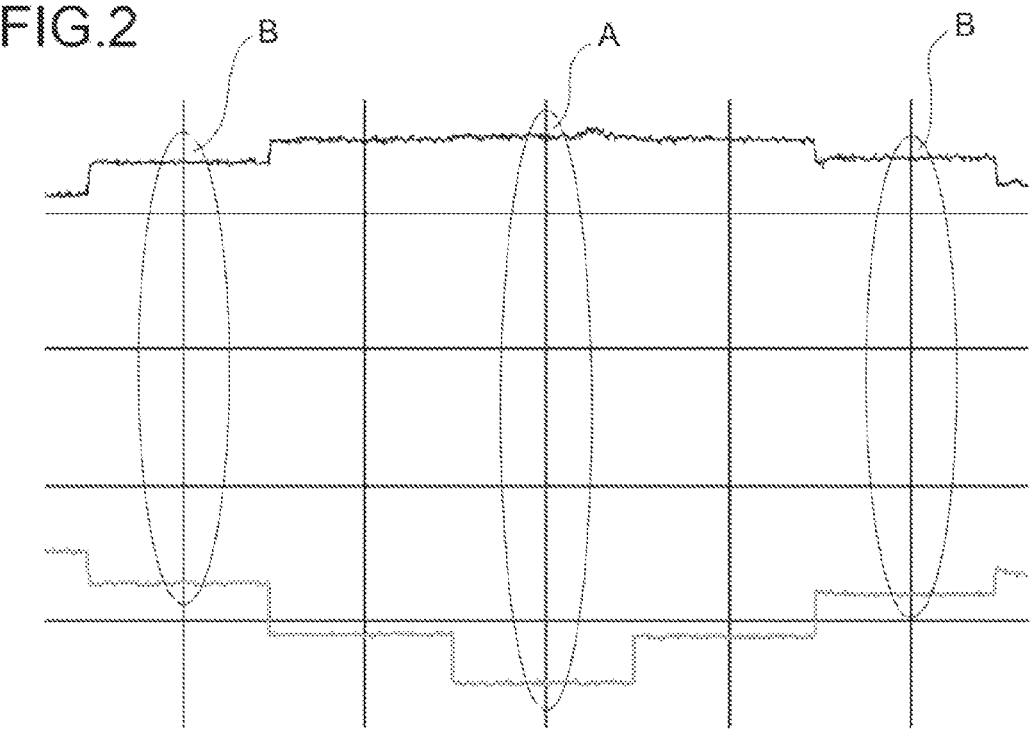
FIG. 2 shows the evolution of the currents d-q in the conditions of application of the method subject of the invention.

These conditions are shown in FIG. 2, respectively highlighted in the areas indicated with the references A and B. One further piece of information on the correctness of the offset of the resolver may be obtained by evaluating the phase of the currents d-q.

Injecting an exploring excitation current into two reference systems translated by a preset and calibratable value, respectively in excess and in defect around the assumed configuration of minimum reluctance, known as a function of the offset of the resolver, it is possible to measure, for both the reference systems, the sign and the amplitude of the values resulting from the current on the axis d and on the axis q via the formula:

$$i_{estimated\ reference\ system} = i_q \cdot \text{sign}(i_d)$$

Figure 3A:
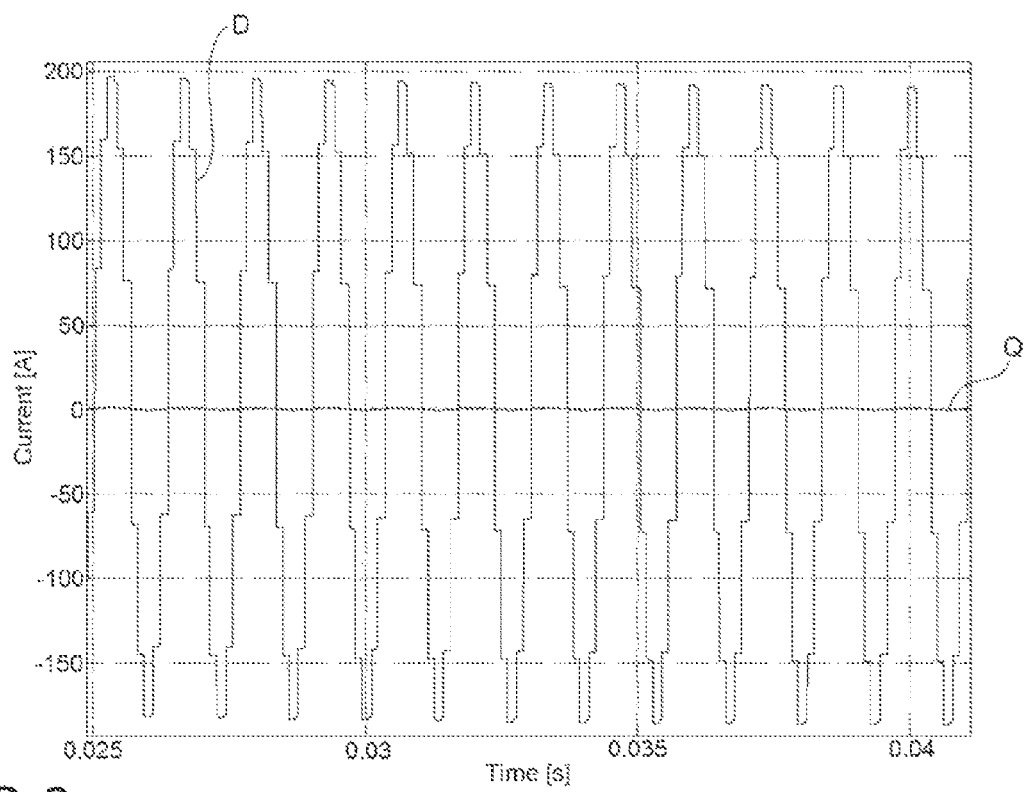
FIGS. 3a-3c show a phase comparison for the currents d-q, in the conditions of application of the method subject of the invention.
Figure 3B:
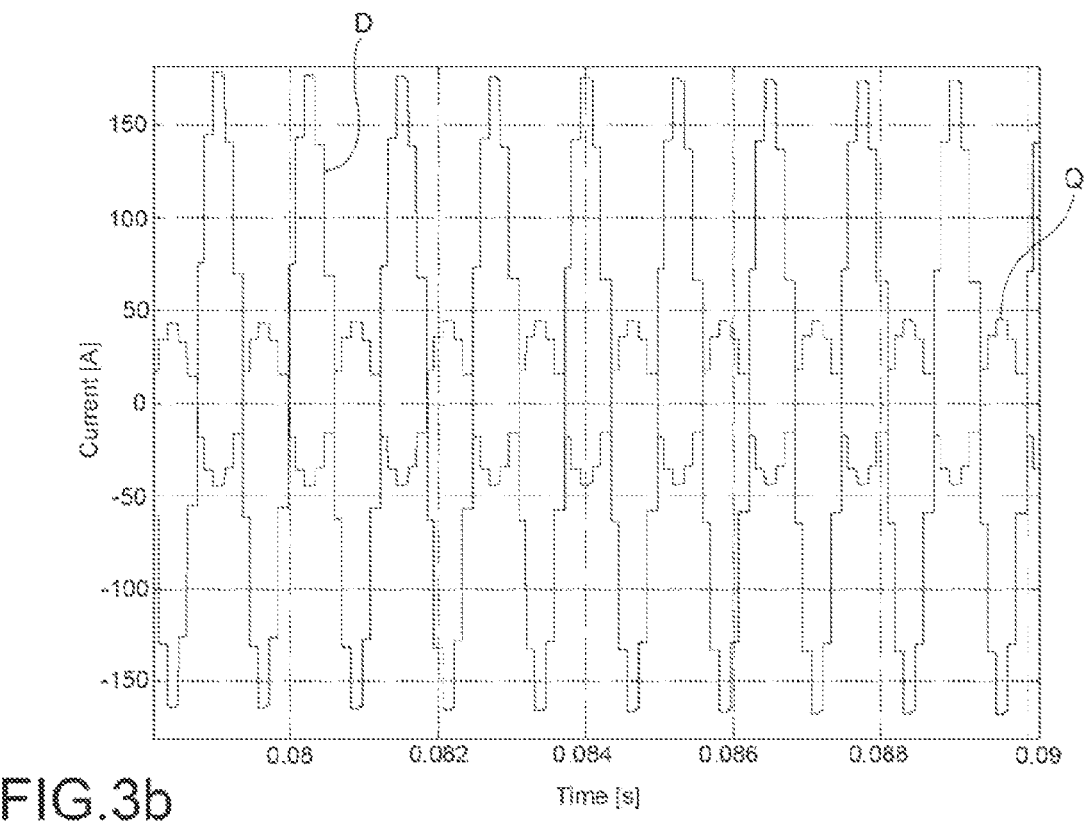
Figure 3C:
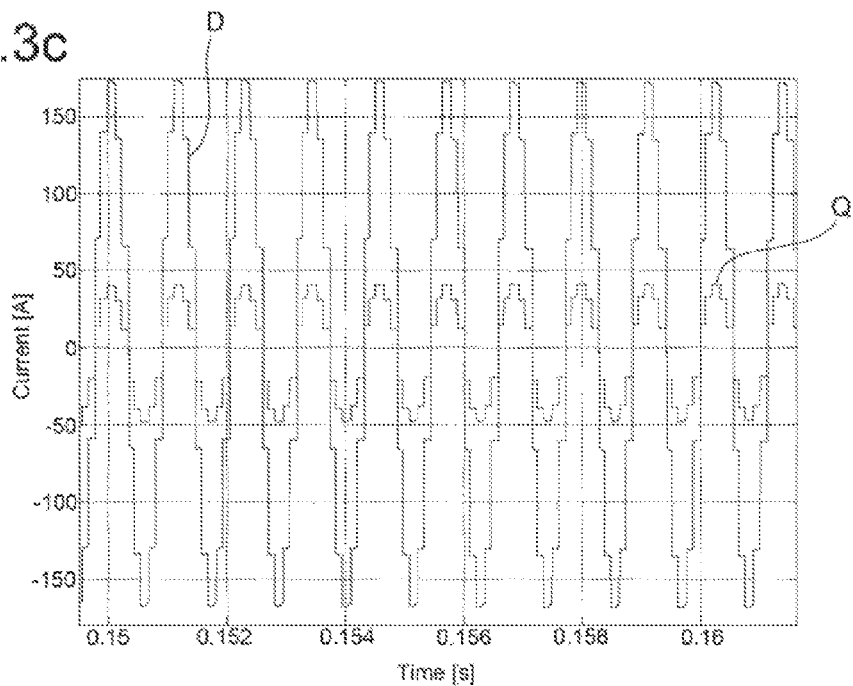

FIGS. 3a, 3b, 3c show the possible conditions in the case of a correct offset of the resolver.

In FIG. 3a, it may be noted that, in the configuration of minimum reluctance, the current with which the motor responds to the application of the exploring excitation current is only on the axis d (curve D), with a negligible value of the current on the axis q (curve Q). It being desired to determine the response of the system in a different reference, in the case in which the reference system for application of the exploring excitation current is translated in excess of a predetermined and calibratable value with respect to the configuration of minimum reluctance, the currents d-q are in phase opposition to each other (FIG. 3b), while in the case in which the reference system for application of the exploring excitation current is translated short of a value predetermined and calibratable with respect to the position of minimum reluctance, the currents d-q are in phase (FIG. 3c).

From the preceding discussion, it is understood that—in the case in which the two resulting terms have opposite signs—the offset of the resolver, via which the angular position of the motor is determined, is definitely correct. In the case in which the two terms on the other hand have the same signs, the offset of the resolver, via which the angular position of the motor is determined, is not correct.

Figure 4:
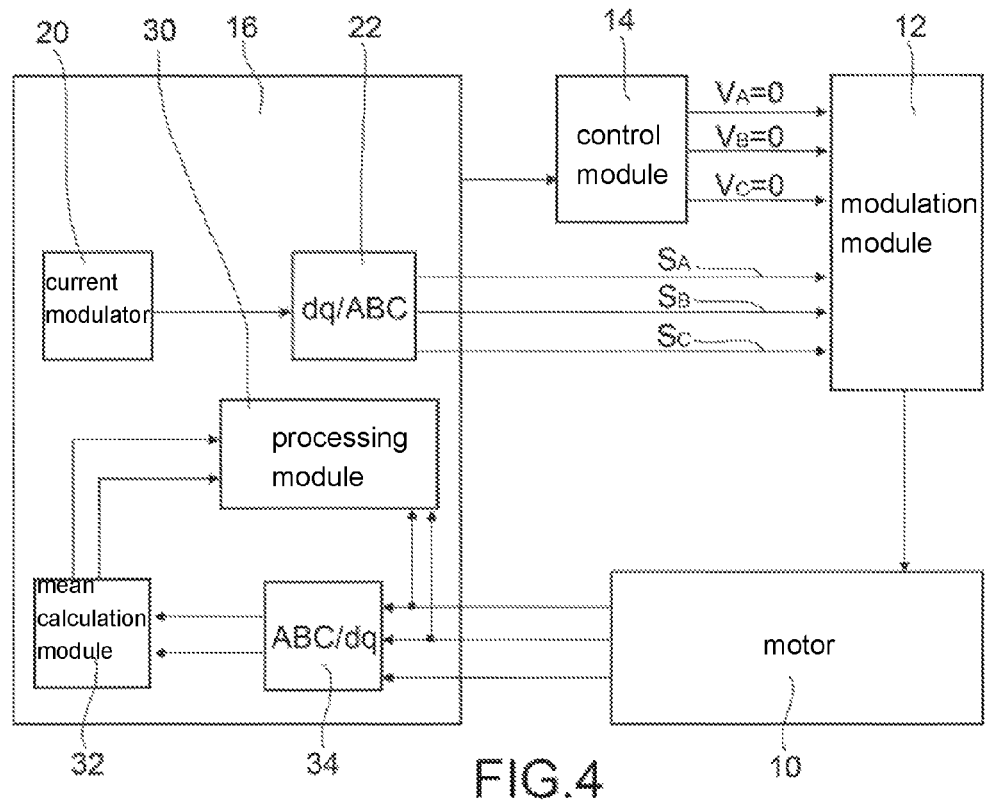
FIG. 4 is a block diagram of a system for the diagnosis of the offset of the resolver of an electric motor, arranged for applying the method subject of the invention.

The above-described method of verification is implemented via a system generally represented in FIG. 4.

The electric motor is indicated by 10, operationally controlled by a modulation module 12 of an inverter circuit, which receives at the input from a control module PI 14 voltage commands at each phase for the actuation of the motor, and from a block 16 for verification of the offset of the resolver, the control signals for an exploring current for each phase, indicated $S_A$, $S_B$, $S_C$. These signals are produced from a current modulator 20 through a reference system transformation module 22.

The block 16 for verification of the offset of the resolver furthermore comprises a processing module 30 for diagnosing the position of the rotor to whose input a module for calculating the mean 32 is coupled, which is disposed downstream of a reference system transformation module 34 coupled to the output of the electric motor. The method is implemented by the system in the figure as follows.

The method is carried out with the motor not in motion, whereby the commands for actuation of the motor, generated by the control module PI 14, are temporarily inhibited or else the phase voltages for each phase are set to zero.

A sinusoidal voltage waveform generated by the current modulator 20 is transformed from the rotating two-phase reference system d-q to the three-phase system A, B, C via the module 22 and supplied to the motor as a set of three control signals for an exploring excitation current for each phase, indicated $S_A$, $S_B$, $S_C$, with an angle predetermined as a function of the phase of the strategy. In a first phase, the same offset angle of the resolver is used as is used in the normal operation of the vehicle. In a second phase, an angle is used whose value is varied with respect to the offset angle of the resolver by a predetermined and calibratable amount, preferably not greater than 20°, in such a manner as to evaluate the response of the motor in a different reference system.

The diagnostic method of the present invention is thus executed in a first transient (following a first pulse of exploring excitation current) considering the position of the rotor read by the resolver, in a second transient (following a second pulse of exploring excitation current) considering the position of the rotor read by the resolver phase-shifted by a predetermined extra angle, in a third transient (following a third pulse of exploring excitation current) considering the position of the rotor read by the resolver phase-shifted by a reduced predetermined angle.

The current measured on the windings of the electric motor is transformed from the three-phase reference system A, B, C to the rotating two-phase reference system d-q in the module 34.

Advantageously, to the value of the currents d-q obtained from the transformation from the three-phase system to the rotating two-phase system a moving average is applied that is useful for obtaining a constant indicator that can be more easily analyzed for the transient in question, typically of 100 ms duration for each of the three measurement transients. The moving average is carried out via an average of the values that each current assumes within a preset period corresponding to the transient or to its own internal interval.

This procedure evaluates which currents d-q the system applies with the position of the rotor used by the vehicle, and subsequently to assess whether this is the correct position (thus with minimum reluctance) by varying the reference system in which the exploring excitation current is applied.

In the case in which the assumed configuration of minimum reluctance is correct (the offset of the known resolver is correct) during the first transient a current of axis d higher and a current of axis q lower than that obtained in the other transients is obtained.

In the case of an error in the assumed configuration of minimum reluctance, due to an error in the knowledge of the offset of the resolver, when the reference is displaced from the one that has been read, a current of axis d lower and a current of axis q higher than that evaluated in the first transient is always obtained.

According to the method, a second control is furthermore executed based on the phase of the currents d-q.

If the assumed configuration of minimum reluctance is correct (the offset of the known resolver is correct) two currents d-q will be obtained whose phase relationship is the following: in phase opposition, if the position is shifted in excess with respect to the one read (second transient, see FIG. 3*b*), and in phase, if the position is shifted in defect (third transient, see FIG. 3*c*). In the case in which the assumed configuration of minimum reluctance is not correct (because of an error in the knowledge of the offset of the resolver), both in the second transient and in the third transient, the same phasing of the currents d-q will be obtained. In this case, both for a shift in excess and for a shift in defect, the behaviour in FIG. 3*b* will be obtained if the position of the rotor read by the resolver exceeds that of minimum reluctance, whereas if the position of the rotor read by the resolver is not correct and in defect with respect to that of minimum reluctance, both for a shift in excess and for a shift in defect, the behaviour in FIG. 3*c* will be obtained.

The method subject of the invention is exclusively implemented when the motor is stationary, for example, in a currently preferred embodiment, before each start to movement of the electric motor, for example for a period of time of the order of 300 ms, which is imperceptible by a user, such as the driver of a vehicle equipped with the aforementioned electric motor. The method subject of the present invention may, conveniently, be implemented in any other similar condition of stationary or stopped vehicle for which there is zero torque demand, for example when the vehicle is parked or stopped at traffic lights.

As will become clearly apparent, the method subject of the invention is carried out without imposing a movement on the rotor of the electric motor, whereby it may also be implemented in vehicles in which electric drive motors are applied directly to the wheels of the vehicle, without causing an undesirable movement of these.

Naturally, while keeping the principle of the invention, the embodiments and the implementation details will be able to be widely varied with respect to what has been described and illustrated purely by way of non-limiting example, without however departing from the scope of protection of the invention defined by the appended claims.

What is claimed:

1. A method for the diagnosis of an offset of a resolver of an electric motor, said method comprising the steps of:
   acquiring a predetermined offset of the resolver associated with said electric motor;
   supplying an excitation current to the phases of said electric motor in a first transient so as to determine the injection of an exploring excitation current on an axis of minimum reluctance of the electric motor in a rotating two-phase reference system (d-q) associated with a rotor of said electric motor, in which the position of said axis of minimum reluctance is determined as a function of said predetermined offset of the resolver;
   determining a current established on the axis of minimum reluctance and a current established on an axis in phase quadrature with respect to the axis of minimum reluctance, as a consequence of said excitation current and as a function of the current detected on the phases of said electric motor;
   supplying an excitation current to the phases of said electric motor in a second and in a third transient, respectively, so as to determine the injection of an exploring excitation current on said axis of minimum reluctance of the electric motor, in which the position of said axis of minimum reluctance is determined as a function of a modified offset of the resolver, wherein said excitation current to the phases of the electric motor is obtained by application of at least one voltage pulse that does not generate any torque to the electric motor and said at least one voltage pulse has a sinusoidal waveform at a predetermined frequency, and wherein said modified offset of the resolver being adjusted by a predetermined amount of deviation, in excess, respectively in defect with respect to the predetermined offset of the resolver;
   diagnosing the correctness of the predetermined offset of the resolver if the current established on the axis of minimum reluctance in the first transient is higher than the current established on the axis of minimum reluctance in the second or third transient, or if the current established on the axis in phase quadrature with respect to the axis of minimum reluctance in the first transient is lower than the current established on the axis in phase quadrature with respect to the axis of minimum reluctance in the second or third transient, or
   diagnosing an error in the predetermined offset of the resolver if the current established on the axis of minimum reluctance in the first transient is lower than the current established on the axis of minimum reluctance in the second or third transient, or if the current established on the axis in phase quadrature with respect to the axis of minimum reluctance in the first transient is higher than the current established on the axis in phase quadrature with respect to the axis of minimum reluctance in the second or third transient.

2. The method as set forth in claim 1, further including the steps of:

diagnosing the correctness of the predetermined offset of the resolver if the current established on the axis of minimum reluctance and the current established on the axis in phase quadrature with respect to the axis of minimum reluctance in the second transient are in phase opposition when an exploring excitation current is injected on an axis of minimum reluctance determined as a function of an offset of the resolver modified by a predetermined amount of deviation in excess over the predetermined offset of the resolver, or if the current established on the axis of minimum reluctance and the current established on the axis in phase quadrature with respect to the axis of minimum reluctance in the third transient are in phase when an exploring excitation current is injected on an axis of minimum reluctance determined as a function of an offset of the resolver modified by a predetermined amount of deviation in defect with respect to the predetermined offset of the resolver.

3. The method as set forth in claim 1, further including the steps of:

diagnosing an error in the predetermined offset of the resolver if the current established on the axis of minimum reluctance and the current established on the axis in phase quadrature with respect to the axis of minimum reluctance in the second transient and in the third transient are both in phase or in opposition of phase when an exploring excitation current is injected on an axis of minimum reluctance determined as a function of an offset of the resolver modified by a predetermined amount of deviation in excess or in defect with respect to the predetermined offset of the resolver.

4. The method as set forth in claim 2, wherein said predetermined amount of deviation of the offset is not greater than 20°.

5. The method as set forth in claim 1, wherein said predetermined frequency is between 400 Hz and 1.2 kHz.

6. The method as set forth in claim 1, including the steps of calculating an average of the values of the currents established on the axis of minimum reluctance and on an axis in phase quadrature with respect to the axis of minimum reluctance as a result of said current of excitation, within a specific period.

7. The method as set forth in claim 1, wherein the steps of the method are carried out when the electric motor is not moving.

8. The method as set forth in claim 7, wherein the steps of the method are performed before every start to movement of the electric motor.

* * * * *

UNITED STATES PATENT AND TRADEMARK OFFICE
CERTIFICATE OF CORRECTION

PATENT NO. : 9,821,679 B2  
APPLICATION NO. : 14/823601  
DATED : November 21, 2017  
INVENTOR(S) : Andrea Stefani et al.

Page 1 of 1

It is certified that error appears in the above-identified patent and that said Letters Patent is hereby corrected as shown below:

Item (54) Title: delete "METHOD FOR THE DIAGNOSIS OF THE OFFSET OF THE RESOLVER OF AN ELECTRIC MACHINE" and insert therefor --METHOD FOR THE DIAGNOSIS OF THE OFFSET OF THE RESOLVER OF AN ELECTRIC MOTOR--.

Signed and Sealed this  
Thirtieth Day of January, 2018

Joseph Matal  
*Performing the Functions and Duties of the*  
*Under Secretary of Commerce for Intellectual Property and*  
*Director of the United States Patent and Trademark Office*